United States Patent [19]

Blenkush et al.

[11] Patent Number: 4,903,995
[45] Date of Patent: Feb. 27, 1990

[54] SELF-TIGHTENING SOFT TUBING FITTING AND METHOD OF USE

[75] Inventors: Brian J. Blenkush, Maple Grove; Blaine C. Sturm, Anoka, both of Minn.

[73] Assignee: Colder Products Company, St. Paul, Minn.

[21] Appl. No.: 252,254

[22] Filed: Sep. 30, 1988

[51] Int. Cl.⁴ ............................................. F16L 35/00
[52] U.S. Cl. .................................. 285/38; 285/255; 285/921; 285/81; 29/525
[58] Field of Search .................... 285/81, 38, 87, 249, 285/255, 921, 315; 29/525

[56] References Cited

U.S. PATENT DOCUMENTS

| | | |
|---|---|---|
| 186,855 | 1/1877 | Leland ................................ 285/255 |
| 3,262,721 | 7/1966 | Knight ............................ 285/921 X |
| 4,109,940 | 8/1978 | Reneau ............................ 285/81 X |
| 4,278,279 | 7/1981 | Zimmerman ........................ 285/255 |
| 4,317,471 | 3/1962 | King .................................. 285/921 X |
| 4,436,125 | 3/1986 | Blenkush . | 
| 4,500,118 | 2/1985 | Blenkush . |
| 4,541,457 | 8/1985 | Blenkush . |
| 4,630,847 | 12/1986 | Blenkush . |
| 4,703,957 | 10/1987 | Blenkush . |
| 4,750,764 | 6/1988 | Gibellina . |

FOREIGN PATENT DOCUMENTS 1535688 8/1968 France ................. 285/255

OTHER PUBLICATIONS

4-Page Hardie Irrigation-Dura Pol TM brochure (Exhibit D).
Colder Products Company, 1989 catalogue entitled Quick Coupling for Plastic Tubing, pp. 1-36 (Exhibit E).
Photographs of LOC-EZE ® Connector (Exhibits A, B, C).
Festo Pneumatic brochure entitled, "Pneumatic Fittings and Accessories from FESTO; Fittings, Connectors, Tubing, Accessories", (cover sheet and pp. 3 & 4), Exhibit A.
LEGRIS brochure entitled, "Push to Connect Fittings", (cover sheet and p. 3), Exhibit B.

*Primary Examiner*—Dave W. Arola
*Attorney, Agent, or Firm*—Merchant, Gould, Smith, Edell, Welter & Schmidt

[57] ABSTRACT

An improved self-tightening fitting and fitting connector for use with soft tubing includes a stem having a flange at one end over which a piece of soft tubing may be pulled, and a sleeve which is slidable over the stem and has an inwardly extending lip with a contact surface thereon. A releasable ratchet mechanism prevents movement of the sleeve away from the flange, so that tubing can be secured tightly between the contact surface of the sleeve and the flange. When tension is applied to the tubing, the lip portion catches on the tubing, urging the contact surface tighter against the flange, preventing the tubing from creeping through the clamping couple formed by the sleeve and flange. When it is desired to disconnect the tubing, the ratchet mechanism can be released. The method of use is also disclosed.

42 Claims, 3 Drawing Sheets

SELF-TIGHTENING SOFT TUBING FITTING AND METHOD OF USE

BACKGROUND OF THE INVENTION

1. Field of the Invention

The present invention relates to fittings which are used for securing and fastening soft tubing. More particularly, the present invention relates to an improved fitting that is self-tightening, so as to prevent slipping, inexpensive and has a simple two-piece construction that is simple to use.

2. Description of the Prior Art

Soft plastic tubing is a popular and versatile way of ducting fluids, and is used in a wide variety of both research and commercial applications. Such tubing is light and relatively easy to use, because of its flexibility. However, the higher grades of such tubing can be relatively expensive, which has led users to splice several shorter sections together for a new job rather than buying a new length of tubing. Fittings to effect such splicing and for securing and fastening soft tubing to other types of fluid ducting or storing structure are commercially available, but have many disadvantages. The most common prior art devices used for this purpose generally required a hose-type clamp or other fitting that was used to grip the inside and outside of the soft tubing, which reduced flow through the tubing by constricting the tubing. Such fittings commonly required a screwdriver or other device for locking and releasing the fitting onto the tubing, which required a substantial amount of labor time if multiple connections were to be made. In addition, due to the soft, elastic nature of the tubing, it was not unusual for the tubing to slip out of such fittings when relative tension existed between the tubing and the fitting. This was a serious problem, because the soft elastic nature of such tubing frequently causes it to unexpectedly shrink along its axis when internally pressurized, leading to unwanted tension between the tubing and fitting.

It is clear that there has existed a long and unfilled need in the prior art for a improved fitting for use with soft tubing that is simple and inexpensive to install, is effective against slipping when the tube is under tension, and that is less obstructive to fluid flow within the tubing while in use.

SUMMARY OF THE INVENTION

Accordingly, it is an object of the present invention to provide an improved fitting for use with soft tubing that is simple and inexpensive to install, wherein gripping force is increased proportionately to the tensile force which exists between fitting and tubing, and that does not unreasonably constrict the tubing during use.

According to the present invention, an improved fitting for use with soft tubing includes a body section defining an axially extending passage therein, a stem which is adapted for receiving a section of soft tubing over at least a portion thereof, the stem extending axially from the body section and having a passage defined therein which is in communication with the body section passage, a radially extending flange at an end of the stem that is distal from the body section and is adapted for sealing against an inner wall of the tubing, a sleeve element mounted for sliding movement on the stem and having an annular contact surface defined thereon which is adapted for sealing against an outer wall of the tubing, and structure for releasably locking the sleeve element with respect to the stem, whereby a section of soft tubing may be tightly secured, in communication with the passages, between the sleeve element and the flange. Preferably, the annular contact surface is formed on a lip portion of the sleeve element which extends radially inward toward the stem, so that the lip portion will catch on the secured tubing when tension is applied thereto, urging the annular contact surface toward the flange with greater force so as to ensure retention of the tubing in the connector.

The present invention also includes a method of using the above-described connector for connecting and disconnecting a section of soft tubing to a desired tube or fitting, which includes connecting the fitting to the desired tube or fitting, slipping a section of soft tubing over the flange and pulling the sleeve toward the flange, so that the soft tubing is secured between the flange and the contact surface in communication with the axial passage, and is held in place by the releasable locking structure. To release the connector, the method of the present invention provides the additional steps of releasing the releasable locking structure, pushing the sleeve away from the flange and pulling the soft tubing off of the stem.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
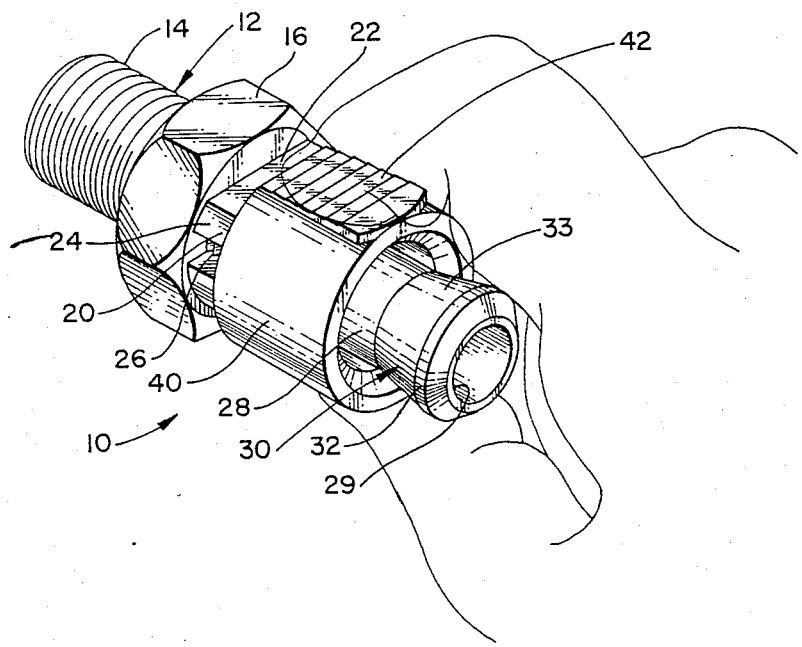
FIG. 1 is a perspective view of a connector constructed according to a first preferred embodiment of the present invention.
Figure 2:
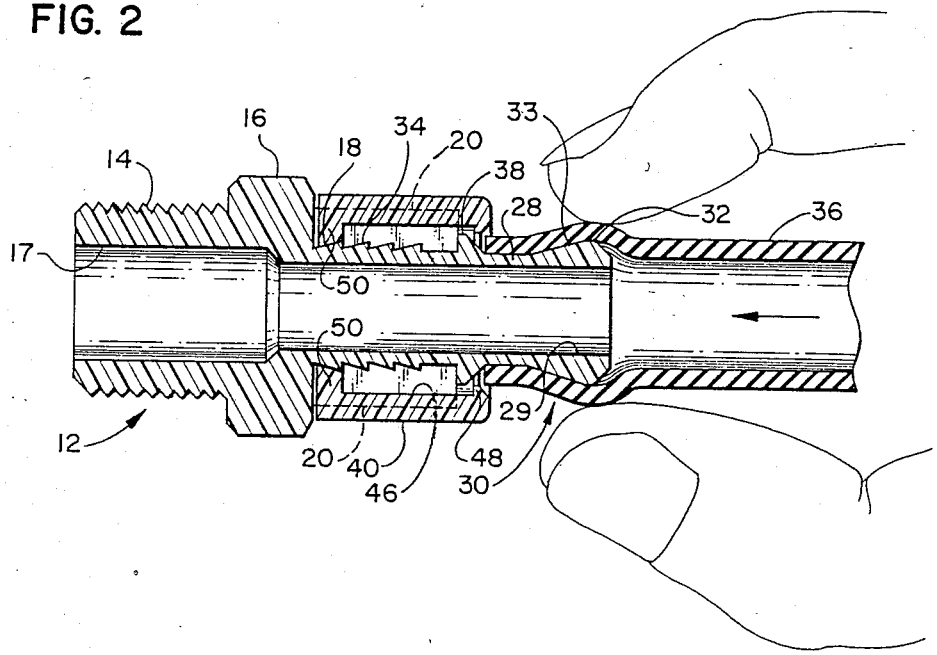
FIG. 2 is a sectional view of the connector illustrated in FIG. 1 depicting a piece of soft tubing being slipped thereover.

Referring to FIG. 1, a soft tubing fitting 10 according to a first embodiment of the invention is constructed as a standard male fitting including a body section 12 having a threaded portion 14 and a hexagonal section 16 which is adapted to receive a wrench or other fitting tool. Although a male fitting is shown in the illustrated embodiments, it is to be understood that a fitting connector according to the present invention may be used in other configurations, such as a dual connector fitting unit that has utility for splicing or a female unit, for example. As shown in FIG. 2, body section 12 has an axially extending bore 17 defined therein through which fluid may pass.

Referring to FIGS. 1–4, a stem 28 extends axially from body section 12 in a direction opposite the threaded portion 14. Stem 28 has an axial bore 29 defined therein which is in communication with the axial bore 17 in body section 12. As shown in FIGS. 1 and 2, stem 28 includes an inner core 18 and a pair of rail members 20 which are secured to inner core 18 at opposite sides thereof. Rail members 20, as clearly shown in FIG. 1, each have flat top surfaces 22 and a pair of curved side surfaces 24. As also shown in FIG. 1, a ratchet strip 26 is formed on each side of the inner core 18 between the rail members 20. Ratchet strip 26 includes a plurality of ratchet teeth 34, each tooth having a surface obliquely angled toward the body section 12.

Stem 28 is further provided with a flange portion 30 on which an annular surface 32 is formed, defining the maximum outer diameter of the flange. Flange 30 further has a conical contact surface 33 formed thereon which obliquely faces the body section 12, as is shown in FIG. 2.

In order to limit the extent that a soft plastic tube 36 may be slipped over the stem 28, the stem is further provided with an annular stop ring 38 midway between the ratchet strip 26 and flange 30. The stop ring 38 ensures that the tubing will not interfere with operation of the ratchet strip when the fitting connector is in use.

Referring again to FIGS. 1–4, a sleeve 40 is mounted on stem 28 for axial movement relative thereto. Sleeve 40 has a first grip surface provided on opposite sides of its circumference which are in the preferred embodiment constructed as raised platforms. Second grip surfaces 44 are spaced intermediate the first grip surfaces 42 and in the preferred embodiment are simply the smooth outside surface of the sleeve 40. As may be seen in FIGS. 1–4, sleeve 40 is substantially formed as a hollow cylinder, and has an inside surface 46 which is adapted to bear against the curved side surfaces 24 of the rail members 20. In this way, rail members 20 allow sleeve 40 and stem 28 to slide relative to each other, but constrain the two elements so that their axes remain coincident.

Figure 3:
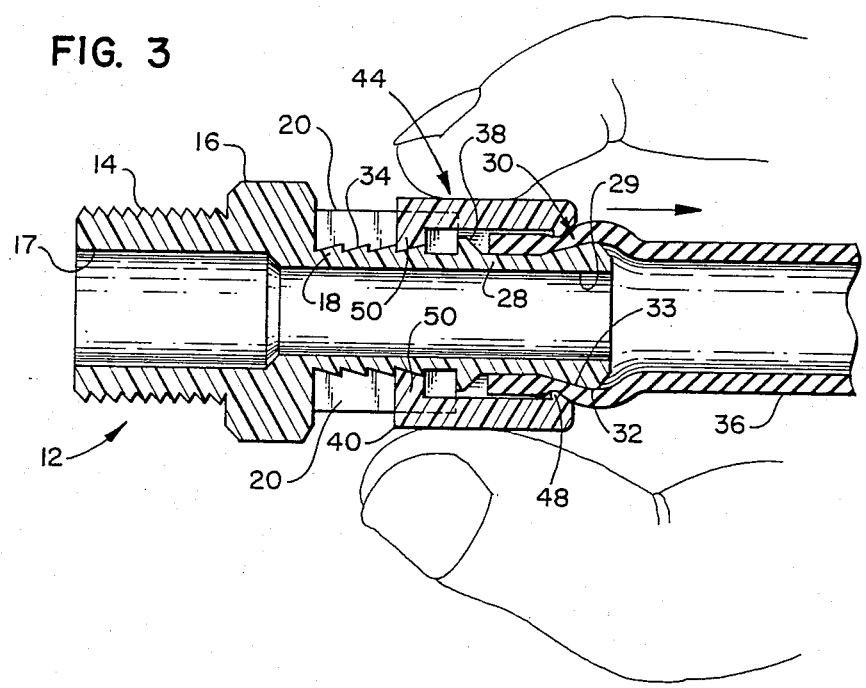
FIG. 3 is a cross-sectional view of the embodiment of FIG. 1 depicting the step of connecting the soft tubing to the connector.
Figure 4:
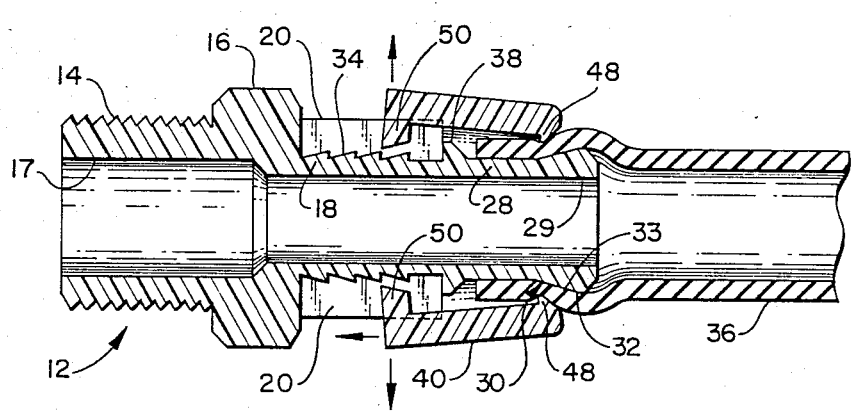
FIG. 4 is a cross-sectional view of the embodiment of FIG. 1 depicting release of the soft tubing from the connector.

As best shown in FIGS. 2–4, sleeve 40 is provided with a pair of pawl-like projections 50 which extend radially inward from the inner surface 46 of sleeve 40 between rail members 20 so as to contact the teeth 34 of ratchet strip 26. In the preferred embodiment, the projections 50 have a width that is slightly less than the space which exists between the rails 20, which constrains sleeve 40 against rotation with respect to stem 28. As shown in FIG. 2, pawl-like projections 50 terminate an angled pawl surface 51 which is adapted to rest against the surfaces of teeth 34 which are obliquely angled toward the body section 12 as above described. In this way, sleeve 40 is constrained against movement away from the flange portion 30 of stem 28, such as when a tube is being clamped.

As shown in FIG. 3, sleeve 40 is provided with an inward radially extending lip portion 48 which defines the minimum inner diameter of the sleeve element. Annular lip portion 48 has a contact surface 49 defined thereon which faces the conical contact surface 33 of flange 30. The outer diameter of flange 30 and the inner diameter of lip 38 thus define an annular extrusion gap in which a tube may be clamped, which gap varies according to the relative displacement of stem 28 and sleeve 40.

All of the above-described connector elements are preferably constructed from a relatively rigid but flexible plastic material such as polypropylene or Delrin ®, but other materials may be used within the scope of the invention. It is particularly important that sleeve 40 be fabricated from a material having a high degree of elasticity.

The operation of a fitting connector constructed according to the embodiment illustrated in FIGS. 1–4 may be explained as follows. As shown in FIG. 2, a length of tubing 36 may be slipped over flange portion 30 onto stem 28 until the tubing reaches the annular stop ring 38. Sleeve 40 is then gripped by the thumb and forefinger of a user at the second grip surfaces 44 to pull sleeve 40 toward flange 30, so that the tube 36 is securely gripped between contact surface 49 on the sleeve and conical contact surface 33 of the flange as is illustrated in FIG. 3. At this time, the pawl-like projections 50 will seat against one of the teeth on each side of ratchet section 26, thereby securing the sleeve against the tubing and flange.

Should axial tension develop between tube 36 and the fitting 10 during use, the tubing will pull against the downwardly extending, almost tooth-like annular lip portion 48, thereby urging the sleeve 40 and contact surface 49 proportionately tighter against the tube so as to prevent the tube from slipping out of the connector.

If it is desired to disconnect the tubing 36 from the connector, the user may place his or her thumb or forefinger on the first grip surfaces 42, as is depicted in FIG. 1. Because sleeve 40 is fabricated from an elastic, resilient material, sleeve 40 will deform under the force which is applied to first grip surfaces 42, causing the pawl-like projections 50 to deflect outwardly away from teeth 34, as is illustrated in FIG. 4. Sleeve 40 may then be pushed away from flange 30, allowing the soft tubing to be pulled off of stem 28.

Figure 6:
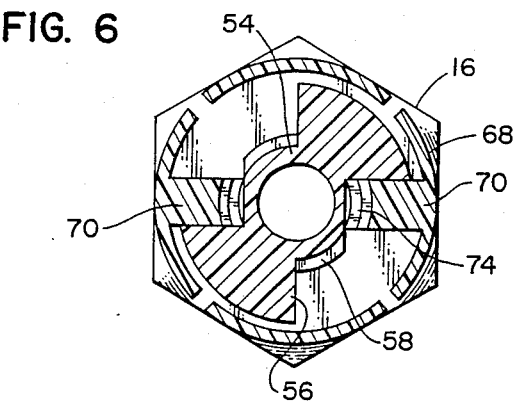
FIG. 6 is a cross-sectional view of the second embodiment of the present invention taking along lines A—A in FIG. 5.
Figure 5:
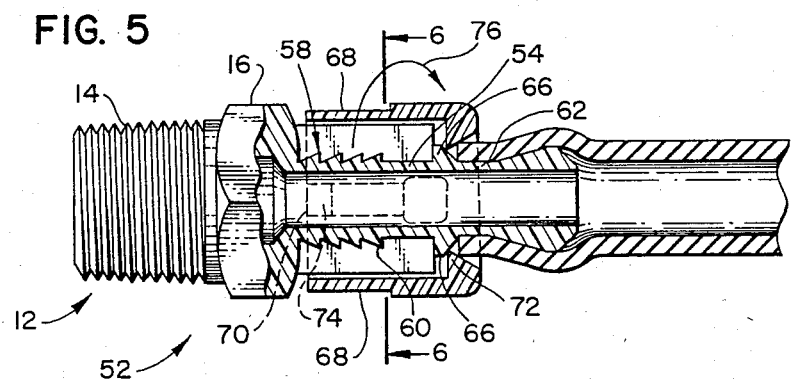
FIG. 5 is a view partially in cross-section of a connector constructed according to a second embodiment of the present invention, in which a piece of soft tubing is being secured to the connector.
Figure 7:
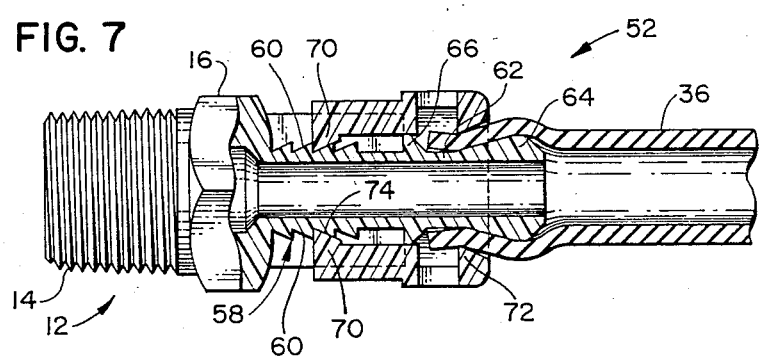
FIG. 7 is a view partially in cross-section of the embodiment illustrated in FIG. 5 depicting the connector when it is secured to a piece of plastic tubing.

A fitting 52 constructed according to a second embodiment of the present invention is illustrated in FIGS. 5–7. Fitting 52 is similar in construction to the above-described embodiment except for the below-described differences. In this embodiment, a stem 62 is provided with an inner core 54 which supports a pair of rail members 56, as is best shown in FIG. 6. As is also shown in FIG. 6, a pair of ratchet strips 58 having teeth 60 are provided on the inner core 54 of stem 62. Stem 62 is provided with a radially extending flange 64 at a distal end thereof and further includes an annular stop ring 66 formed between the flange 64 and ratchet strips 58 to limit the extent to which a tube 36 may be slipped thereover.

As shown in FIG. 6, a smooth surface 74 is formed on the inner core 54 next to each of the ratchet strips 58. Smooth surfaces 74 have substantially the same width about the periphery of inner core 54 as do ratchet strips 58.

Similarly to the first embodiment of the present invention that is above described, a sleeve 68 is provided with a pair of pawl projections 70 which are adapted to contact the teeth 64 of ratchet strip 58 and have a width that is substantially equal to the widths of ratchet strips 58 and smooth surfaces 74. Sleeve 68 includes an annular downwardly extending radial lip 72 which is analogous in form and function to lip portion 48 in the embodiment of FIGS. 1–4.

In operation, a tube 36 is slipped over stem 62 and flange 64 until it contacts the annular stop ring 66, to reach the position illustrated in FIGS. 5 and 7. Sleeve 68 is then pulled toward the flange 64 to reach the position illustrated in FIG. 7, so that the tube is secured by the ratchet mechanism between the relative contact surfaces of the sleeve 68 and flange 64. If tension is applied between the tube and the fitting in this state, the tube will catch on lip 72, thereby urging the contact surfaces of the sleeve and the flange together with proportionately more force.

When it is desired to release the tube 36 from a connector constructed according to the embodiment of FIGS. 6–8, sleeve 68 is rotated about its axis in the direction depicted by arrow 76 in FIG. 5, which causes pawl projections 70 to disengage from the teeth 60 of ratchet strip 58 and to be repositioned over the smooth surfaces 74 which are formed on the inner core 54. As a result, the sleeve may then be pushed away from the flange without interference by the ratchet mechanism, and the tube may then be pulled off of the stem 62.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An improved fitting for use with soft tubing, comprising:
   a body section defining an axially extending passage therein;
   stem means adapted for receiving a section of soft tubing over at least a portion thereof, said stem means extending axially from said body section and having a passage defined therein which is in communication with said body section passage;
   radially extending flange means at an end of said stem means that is distal from said body section and adapted for sealing against an inner wall of the tubing;
   sleeve means mounted for sliding movement on said stem means and having an annular contact surface defined thereon adapted for sealing against an outer wall of the tubing;
   the radial distance between said flange means and the contact surface of said sleeve means being less than the thickness of the soft tubing;
   stop means intermediate of the radially extending flange means and the body section for limiting axial movement of the sleeve means toward the radially extending flange means; and
   means for releasably locking said sleeve means with respect to said stem means, whereby a section of soft tubing may be tightly secured, in communication with said passages, between said sleeve means and said flange means.

2. Apparatus according to claim 1, wherein said annular contact surface is formed on a lip portion of said sleeve means which extends radially inward toward said stem means, whereby said lip portion will catch on the secured tubing when tension is applied thereto, urging said annular contact surface toward said flange means with greater force so as to ensure retention of the tubing in the connector.

3. Apparatus according to claim 2, wherein said flange means includes a conical contact surface obliquely facing said body section and cooperable with said annular contact surface for securing the tubing.

4. Apparatus according to claim 1, wherein said body section comprises a threaded male connector element having a hexagonal section for receiving a wrench or the like.

5. Apparatus according to claim 1, wherein said releasable locking means comprises ratchet means for constraining said sleeve means against movement away from said flange means, and means for releasing said ratchet means.

6. Apparatus according to claim 5, wherein said ratchet means comprises at least one pawl extending from said sleeve means inwardly toward said stem means, and a corresponding number of ratchet strips mounted on said stem means having teeth thereon adapted for receiving said pawls, said teeth each having a surface obliquely angled toward said body section so as to permit movement of the pawls away from the body section only.

7. Apparatus according to claim 6, wherein said releasing means comprises means for disengaging said pawls from said ratchet strips.

8. Apparatus according to claim 7, wherein said means for disengaging said pawls from said ratchet strips comprises a smooth surface defined on said stem means adjacent each of said ratchet strips, and means permitting rotation of said sleeve means relative to said stem means in order to disengage said pawls from said ratchet strips.

9. Apparatus according to claim 7, wherein said pawls and ratchet strips are no more than two in number and are disposed symmetrically about a first plane passing through the axis of said stem means, and said sleeve means is formed of a resilient deformable material, wherein said means for disengaging said pawls from said ratchet strips comprises a pair of grip surfaces formed on an outside surface of said sleeve means so each intersects a second plane perpendicular to said first plane, whereby the sleeve means is deformable by squeezing the grip surfaces to an extent necessary to retract the pawls from the ratchet strips.

10. Apparatus according to claim 9, wherein there are two pawls and two ratchet strips.

11. Apparatus according to claim 9, wherein said grip surfaces are substantially planar platforms provided on said sleeve means.

12. Apparatus according to claim 1, further comprising an annular stop ring formed on said stem means for limiting insertion of the tubing over said stem means.

13. Apparatus according to claim 1, wherein said contact surface on sleeve means includes an annular lip means for engaging an outer surface of the soft tubing.

14. Apparatus according to claim 1, wherein said stop means includes a conical surface obliquely facing away from said body section so as to facilitate sliding of said sleeve means onto said stem means.

15. An apparatus according to claim 14, wherein the stop means includes a surface facing said body section an extending radially away from the longitudinal axis at substantially 90°.

16. An improved connector for use with a soft tube fitting, comprising:

stem means adapted at a first end for connection to the body of a fitting, said stem means having an axial passage defined therein and adapted for receiving a section of soft tubing over at least a portion thereof;

radially extending flange means at a second end of said stem means for sealing against an inner wall of the tubing;

sleeve means mounted for sliding movement on said stem means and having an annular contact surface defined thereon adapted for sealing against on outer wall of the tubing;

the radial distance between said flange means and the contact surface of said sleeve means being less than the thickness of the soft tubing;

stop means for limiting axial movement of the sleeve means toward the radially extending flange means; and means for releasably locking said sleeve means with respect to said stem means, whereby a section of soft tubing may be tightly secured, in communication with said passage, between said sleeve means and said flange means.

17. Apparatus according to claim 16, wherein said annular contact surface is formed on a lip portion of said sleeve means which extends radially inward toward said stem means, whereby said lip portion will catch on the secured tubing when tension is applied thereto, urging said annular contact surface toward said flange means with greater force so as to ensure retention of the tubing in the connector.

18. Apparatus according to claim 14, wherein said flange means includes a conical contact surface obliquely facing said body section and cooperable with said annular contact surface for securing the tubing.

19. Apparatus according to claim 13, wherein said releasable locking means comprises ratchet means for constraining said sleeve means against movement away from said flange means, and means for releasing said ratchet means.

20. Apparatus according to claim 16, wherein said ratchet means comprises at least one pawl extending from said sleeve means inwardly toward said stem means, and a corresponding number of ratchet strips mounted on said stem means having teeth thereon adapted for receiving said pawls, said teeth each having a surface obliquely angled toward said body section so as to permit movement of the pawls away from the body section only.

21. Apparatus according to claim 20, wherein said releasing means comprises means for disengaging said pawls from said ratchet strips.

22. Apparatus according to claim 21, wherein said means for disengaging said pawls from said ratchet strips comprises a smooth surface defined on said stem means adjacent each of said ratchet strips, and means permitting rotation of said sleeve means relative to said stem means in order to disengage said pawls from said ratchet strips.

23. Apparatus according to claim 21, wherein said pawls and ratchet strips are no more than two in number and are disposed symmetrically about a first plane passing through the axis of said stem means, and said sleeve means is formed of a resilient deformable material, wherein said means for disengaging said pawls from said ratchet strips comprise a pair of grip surfaces formed on an outside surface of said sleeve means so each intersects a second plane perpendicular to said first plane, whereby the sleeve means is deformable by squeezing the grip surfaces to an extent necessary to retract the pawls from the ratchet strips.

24. Apparatus according to claim 23, wherein there are two pawls and two ratchet strips.

25. Apparatus according to claim 23, wherein said grip surfaces are substantially planar platforms provided on said sleeve means.

26. Apparatus according to claim 16, further comprising an annular stop ring formed on said stem means for limiting insertion of the tubing over said stem means.

27. A method for connecting and disconnecting a section of soft tubing to a desired tube or fitting, comprising:

providing a fitting having a body section in which an axial passage is defined, a stem extending from the body section and having a passage defined therein in communication with the body section passage, a flange on an end of the stem distal the body section, a sleeve axially slidable with respect to the stem and having a contact surface thereon which faces the flange and a releasable ratchet mechanism for constraining the sleeve from moving away from the flange; the radial distance between said flange and the contact surface of said sleeve being less than the thickness of the soft tubing;

connecting the fitting to the desired tube or fitting;
slipping the section of soft tubing over the flange; and
pulling the sleeve toward the flange, whereby the soft tubing is secured between the flange and the contact surface in communication with the axial passage, and is held in place by the ratchet mechanism.

28. A method according to claim 27, further comprising the steps of:
releasing the ratchet mechanism;
pushing the sleeve away from the flange; and
pulling the soft tubing off of the stem.

29. An improved fitting for use with soft tubing, comprising:
a body section defining an axially extending passage therein;
stem means adapted for receiving a section of soft tubing over at least a portion thereof, said stem means extending axially from said body section and having a passage defined therein which is in communication with said body section passage;
radially extending flange means at an end of said stem means that is distal from said body section and adapted for sealing against an inner wall of the tubing;
sleeve means mounted for sliding movement on said stem means and having an annular contact surface defined thereon adapted for sealing against an outer wall of the tubing;
the radial distance between said flange means and the contact surface of said sleeve means being less than the thickness of the soft tubing; and
means for releasably locking said sleeve means with respect to said stem means, whereby a section of soft tubing may be tightly secured, in communication with said passages, between said sleeve means and said flange means, said releasably locking means comprising ratchet means for constraining said sleeve means against movement away from said flange means, and means for releasing said ratchet means.

30. Apparatus according to claim 26, wherein said ratchet means comprises at least one pawl extending from said sleeve means inwardly toward said stem means, and a corresponding number of ratchet strips mounted on said stem means having teeth thereon adapted for receiving said pawls, said teeth each having a surface obliquely angled toward said body section so as to permit movement of the pawls away from the body section only.

31. Apparatus according to claim 30, wherein said releasing means comprises means for disengaging said pawls from said ratchet strips.

32. Apparatus according to claim 31, wherein said means for disengaging said pawls from said ratchet strips comprises a smooth surface defined on said stem means adjacent each of said ratchet strips, and means permitting rotation of said sleeve means relative to said stem means in order to disengage said pawls from said ratchet strips.

33. Apparatus according to claim 31, wherein said pawls and ratchet strips are no more than two in number and are disposed symmetrically about a first plane passing through the axis of said stem means, and said sleeve means is formed of a resilient deformable material, wherein said means for disengaging said pawls from said ratchet strips comprises a pair of grip surfaces formed on an outside surface of said sleeve means so each intersects a second plane perpendicular to said first plane, whereby the sleeve means is deformable by squeezing the grip surfaces to an extent necessary to retract the pawls from the ratchet strips.

34. Apparatus according to claim 33, wherein there are two pawls and two ratchet strips.

35. Apparatus according to claim 33, wherein said grip surfaces are substantially planar platforms provided on said sleeve means.

36. An improved connector for use with a soft tube fitting, comprising:
  stem means adapted at a first end for connection to the body of a fitting, said stem means having an axial passageway defined therein and adapted for receiving a section of soft tubing over at least a portion thereof;
  radially extending flange means at a second end of said stem means for sealing against an inner wall of the tubing;
  sleeve means mounted for sliding movement on said stem means and having an annular contact surface defined thereon adapted for sealing against an outer wall of the tubing;
  the radial distance between said flange means and the contact surface of said sleeve means being less than the thickness of the soft tubing; and
  means for releasably locking said sleeve means with respect to said stem means, whereby a section of soft tubing may be tightly secured, in communication with said passage, between said sleeve means and said flange means, said releasably locking means comprising ratchet means for constraining said sleeve means against movement away from said flange means and means for releasing said ratchet means.

37. Apparatus according to claim 36, wherein said ratchet means comprises at least one pawl extending from said sleeve means inwardly toward said stem means, and a corresponding number of ratchet strips mounted on said stem means having teeth thereon adapted for receiving said pawls, said teeth each having a surface obliquely angled toward said body section so as to permit movement of the pawls away from the body section only.

38. Apparatus according to claim 37, wherein said releasing means comprises means for disengaging said pawls from said ratchet strips.

39. Apparatus according to claim 38, wherein said means for disengaging said pawls from said ratchet strips comprises a smooth surface defined on said stem means adjacent each of said ratchet strips, and means permitting rotation of said sleeve means relative to said stem means in order to disengage said pawls from said ratchet strips.

40. Apparatus according to claim 38, wherein said pawls and ratchet strips are no more than two in number and are disposed symmetrically about a first plane passing through the axis of said stem means, and said sleeve means is formed of a resilient deformable material, wherein said means for disengaging said pawls from said ratchet strips comprise a pair of grip surfaces formed on an outside surface of said sleeve means so each intersects a second plane perpendicular to said first plane, whereby the sleeve means is deformable by squeezing the grip surfaces to an extent necessary to retract the pawls from the ratchet strips.

41. Apparatus according to claim 40, wherein there are two pawls and two ratchet strips.

42. Apparatus according to claim 40, wherein said grip surfaces are substantially planar platforms provided on said sleeve means.

* * * * *

UNITED STATES PATENT AND TRADEMARK OFFICE
CERTIFICATE OF CORRECTION

PATENT NO. : 4,903,995

DATED : February 27, 1990

INVENTOR(S) : Blenkush et al.

It is certified that error appears in the above-identified patent and that said Letters Patent is hereby corrected as shown below:

Column 2, line 55, "taking" should be --taken--.

Column 7, line 32, "claim 14" should be --claim 17--.

Column 7, line 36, "claim 13" should be --claim 16--.

Column 7, line 41, "claim 16" should be --claim 19--.

Column 9, line 1, "claim 26" should be --claim 29--.

Column 9, line 43, "passageway" should be --passage--.

Signed and Sealed this

Sixteenth Day of June, 1992

*Attest:*

DOUGLAS B. COMER

*Attesting Officer*     *Acting Commissioner of Patents and Trademarks*